US011524699B2

(12) United States Patent
Higashide et al.

(10) Patent No.: US 11,524,699 B2
(45) Date of Patent: Dec. 13, 2022

(54) OPERATION MANAGEMENT DEVICE FOR AUTOMATIC RUNNING VEHICLE AND AUTOMATIC RUNNING VEHICLE

(71) Applicants: TOYOTA JIDOSHA KABUSHIKI KAISHA, Toyota (JP); DENSO CORPORATION, Aichi-pref (JP)

(72) Inventors: Hiroshi Higashide, Toyota (JP); Kenji Okazaki, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 50 days.

(21) Appl. No.: 17/194,570

(22) Filed: Mar. 8, 2021

(65) Prior Publication Data
US 2021/0309249 A1 Oct. 7, 2021

(30) Foreign Application Priority Data

Apr. 2, 2020 (JP) .............................. JP2020-066659

(51) Int. Cl.
*B60W 60/00* (2020.01)
*G08G 1/123* (2006.01)
*B60W 30/18* (2012.01)
*G06V 20/58* (2022.01)

(52) U.S. Cl.
CPC .... *B60W 60/001* (2020.02); *B60W 30/18109* (2013.01); *G06V 20/58* (2022.01); *G08G 1/123* (2013.01); *B60W 2420/403* (2013.01); *B60W 2554/4049* (2020.02)

(58) Field of Classification Search
CPC ................ B60W 60/30; B60W 30/18; B60W 30/18109; G08G 1/123; G08G 1/0125; G08G 1/00; G06K 9/00; G06K 9/00805
See application file for complete search history.

(56) References Cited

U.S. PATENT DOCUMENTS

| 6,546,371 B1* | 4/2003 | Doner ................... G06Q 10/047 701/19 |
| 2014/0088865 A1* | 3/2014 | Thies ...................... G01C 21/34 701/465 |
| 2015/0294430 A1 | 10/2015 | Huang et al. |
| 2016/0075357 A1* | 3/2016 | Jung ...................... B61L 25/025 701/20 |
| 2018/0376357 A1* | 12/2018 | Tavares Coutinho ...................... H04W 64/003 |

FOREIGN PATENT DOCUMENTS

| CN | 104269048 A | 1/2015 |
| JP | 2005-222144 A | 8/2005 |

* cited by examiner

Primary Examiner — Tan Q Nguyen
(74) Attorney, Agent, or Firm — Oliff PLC

(57) ABSTRACT

An operating situation obtaining unit obtains the operating situation information of a plurality of operating vehicles along a predetermined route. A delayed vehicle extraction unit extracts a delayed vehicle that is delayed in actual operation relative to the operation schedule from among the plurality of operating vehicles, based on the operating situation information of the respective operating vehicles. An overtaking instruction unit outputs an overtaking instruction to overtake the delayed vehicle to a following vehicle that immediately follows the delayed vehicle.

10 Claims, 13 Drawing Sheets

OPERATION MANAGEMENT DEVICE FOR AUTOMATIC RUNNING VEHICLE AND AUTOMATIC RUNNING VEHICLE

CROSS REFERENCE TO RELATED APPLICATION

This application claims priority to Japanese Patent Application No. 2020-066659, filed on Apr. 2, 2020, which is incorporated herein by reference in its entirety including the specification, claims, drawings, and abstract.

TECHNICAL FIELD

This specification discloses an automatic running vehicle that automatically runs along a predetermined route, and an operation management device that manages the operation of a plurality of automatic running vehicles.

BACKGROUND

In recent years, there has been suggested a traffic system using vehicles capable of automatic running For example, JP 2005-222144 A describes that an instruction signal regarding the operation of a bus is sent from a management center to each of buses that are running along a dedicated road, based on the boarding rate, speed, and location of the bus. For example, with respect to a bus with a relatively high boarding rate and being delayed; that is, a bus located close in operation interval to its following vehicle, an instruction signal is sent to instruct the bus to pass through a bus stop with people waiting, without stopping there.

A vehicle's passing through a bus stop without stopping there may decrease satisfaction of the passengers waiting at the bus stop. An attempt to get on a vehicle whose boarding rate is already high, however, is troublesome, and may prolong a boarding period at the bus stop. A prolonged boarding period may increase the delay, which may further shorten the operation interval relative to its following vehicle.

To address the above, this specification discloses an operation management device and an automatic running vehicle that can restore an operation interval between a plurality of vehicles in operation to be an operation interval in accordance with an operation plan when a delayed vehicle is caused.

SUMMARY

An operation management device for an automatic running vehicle, disclosed in this specification, manages the operation of a plurality of vehicles for automatic running along a predetermined route. The operation management device includes an operation schedule providing unit, an operating situation obtaining unit, a delayed vehicle extraction unit, and an overtaking instruction unit. The operation schedule providing unit provides an operation schedule to each of operating vehicles that are automatically running along the predetermined route. The operating situation obtaining unit obtains the operating situation information of the plurality of operating vehicles on the predetermined route. The delayed vehicle extraction unit extracts from among the plurality of operating vehicles a delayed vehicle that is delayed in actual operation relative to the operation schedule, based on the operating situation information of each of the operating vehicles. The overtaking instruction unit outputs an overtaking instruction to overtake the delayed vehicle to a following vehicle that immediately follows the delayed vehicle.

When a delay occurs, the operation interval between the delayed vehicle and its immediately following vehicle becomes shorter. That is, as the waiting period after departure of the delayed vehicle from a bus stop to arrival of the following vehicle becomes shorter, a relatively smaller number of people will wait for and get on the following vehicle. Such a following vehicle that is relatively less crowded compared with the delayed vehicle overtakes the delayed vehicle to proceed toward the next bus stop prior to the delayed vehicle. This enables shortening of the boarding period, as compared with that of the crowded delayed vehicle.

In the above-described structure, the overtaking instruction unit may output a stop instruction to the delayed vehicle before outputting the overtaking instruction.

According to the above described structure, the following vehicle waits for the delayed vehicle to stop before beginning to overtake the delayed vehicle. This enables highly safe overtaking.

In the above-described structure, wherein when the actual operation interval between the delayed vehicle and the following vehicle becomes shorter than a predetermined threshold period, the overtaking instruction unit may output the stop instruction to the delayed vehicle.

According to the above described structure, overtaking in accordance with the closeness in actual operation interval is possible.

In the above-described structure, when a delay period in actual operation of the delayed vehicle relative to the operation schedule exceeds a predetermined threshold period, the overtaking instruction unit may output the stop instruction to the delayed vehicle.

According to the above-described structure, overtaking in accordance with the extent of delay of the delayed vehicle is possible.

In the above-described structure, when the percentage of a delay period in actual operation of the delayed vehicle relative to the operation schedule, with respect to the operation interval between the delayed vehicle and the following vehicle, based on the operation schedule exceeds a predetermined threshold percentage, the overtaking instruction unit may output the stop instruction to the delayed vehicle.

According to the above-described structure, the percentage (ratio) between the operation interval and the delay period is used in determining whether overtaking is feasible. This makes it possible to uniformly determine whether overtaking is feasible, for example, even if a plurality of different operation intervals are set.

In the above-described structure, the overtaking instruction unit may output the overtaking instruction after having received a feasible overtaking notice from the following vehicle.

The above-described structure enables outputting an overtaking instruction while taking into consideration the running state (that is, whether overtaking is feasible) of the overtaking vehicle.

An automatic running vehicle disclosed in this specification automatically runs along a predetermined route. The automatic running vehicle includes an operation schedule storage unit and an automatic running control unit. The operation schedule storage unit may store the operation schedule of the automatic running vehicle, provided from an operation management device. The automatic running control unit may execute automatic running control, based on the operation schedule, and execute overtake-running control to overtake a preceding vehicle that is an immediately preceding automatic running vehicle when having received an overtaking instruction from the operation management device.

According to the above-described structure, as described above, the following vehicle that is relatively less crowded than the delayed vehicle overtakes the delayed vehicle to proceed to the next bus stop prior to the delayed vehicle, so that the boarding period can be shortened, and consequently, the operation interval between a plurality of vehicles in operation can be restored to be one in accordance with the operation plan.

The above-described structure may further include a sensor for obtaining surrounding environment information in the forward direction. In this case, the automatic running control unit may send an overtaking request to the operation management device while the preceding vehicle, recognized based on the surrounding environment information obtained from the sensor, remains stopped.

According to the above-described structure, the surrounding situation is recognized with a function that is used in automatic running control, which enables highly safe overtaking.

The above-described structure may further include a schedule change unit for changing the operation schedule stored in the operation schedule storage unit by moving up the operation schedule, owing to the overtaking of the preceding vehicle.

The above-described structure enables automatic running even after overtaking.

In the above-described structure, the predetermined route may be a circulating route. In this case, the operation schedule for one round of the predetermined route may be provided at an operation schedule update point defined on the predetermined route, and stored in the operation schedule storage unit.

The operation schedule may include a target update point passing time at which the automatic running vehicle passes through the operation schedule update point next time, and the operation interval between the automatic vehicles running along the predetermined route.

The schedule change unit may change the target update point passing time defined in the operation schedule by moving up the target update point passing time by an amount corresponding to the operation interval, owing to the overtaking of the preceding vehicle.

According to the above-described structure, discrepancy relative to the regular operation schedule can be eliminated by the time of provision of an operation schedule for the next circulation.

The technique disclosed in this specification makes it possible to restore the operation intervals between a plurality of vehicles in operation to be those in accordance with an operation plan when a delayed vehicle is caused.

BRIEF DESCRIPTION OF DRAWINGS

Embodiment(s) of the present disclosure will be described based on the following figures, wherein.

DESCRIPTION OF EMBODIMENTS

Figure 1:
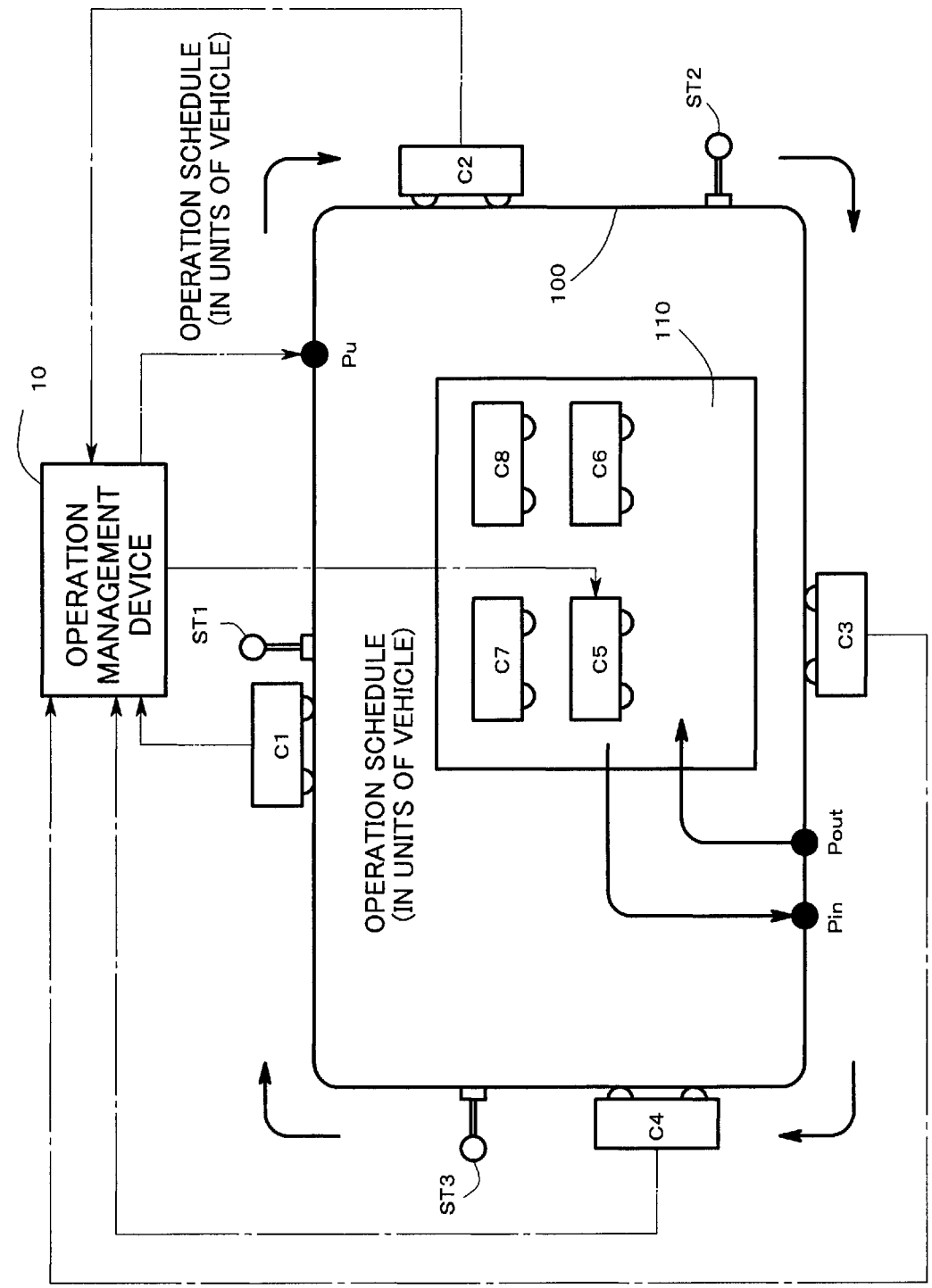
FIG. 1 is a schematic diagram of a traffic system including an automatic running vehicle and an operation management device according to an embodiment.

FIG. 1 schematically illustrates an example of a traffic system including automatic running vehicles C1 to C8 and an operation management device 10 according to an embodiment. This traffic system includes a plurality of bus stops ST1 to ST3 set along a predetermined route 100.

Note that the plurality of automatic running vehicles C1 to C8 will be hereinafter simply referred to as "vehicles C" without suffixed numbers for distinction when distinction is not made. Similarly, the plurality of bus stops ST1 to ST3 as well will be simply referred to as "bus stops ST" when distinction is unnecessary.

In the traffic system exemplified in FIG. 1, the vehicles C run along the predetermined route 100 to transport multiple unspecific users. As exemplified in FIG. 1, the predetermined route 100 may be a circulating route. The vehicles C run one way, as indicated by the illustrated arrows, along the predetermined route 100 in a circulating manner to go around the bus stops ST1 to ST3 located along the predetermined route 100.

The predetermined route 100 may be a dedicated road, for example, where only the vehicles C are allowed to run. In the case where the vehicles C are trains, the predetermined route 100 may be a loop railway. Alternatively, the predetermined route 100 may be a route set on a general road where vehicles other than the vehicles C are also allowed to run.

The traffic system further includes a garage 110 connected to the predetermined route 100. In FIG. 1, the automatic running vehicles C5 to C8 on standby in the garage 110 are illustrated as examples. As connection points to the garage 110, a put-out point Pout and an put-in point Pin are defined on the predetermined route 100. In the example illustrated in FIG. 1, the put-out point Pout and the put-in point Pin are provided between the bus stop ST2 and the bus stop ST3.

The automatic running vehicles C1 to C4 running along the predetermined route 100 enter the garage 110 via the put-out point Pout. Meanwhile, the automatic running vehicles C5 to C8 on standby in the garage 110 are put onto the predetermined route 100 via the put-in point Pin. To avoid intersection between a vehicle C being put out and a vehicle C being put in, the put-out point Pout is defined upstream of the put-in point Pin The predetermined route 100 further includes an operation schedule update point Pu (an operation schedule update position) where the respective automatic running vehicles C1 to C4 in operation are provided with operation schedules. At the operation schedule update point Pu, the operation management device 10 provides each vehicle C passing through the point with an operation schedule for one circulation with the operation schedule update point Pu as a start. As described above, the operation schedule for each vehicle C is changed every passage (that is, every circulation) of the operation schedule update point Pu. Details of a method for providing an operation schedule will be described later.

<Vehicle Structure>

Each vehicle C is a vehicle capable of automatic running along the predetermined route 100 and functions, for example, as a vehicle for transporting multiple unspecific users from a predetermined bus stop ST to another bus stop ST. A vehicle C may be, for example, a bus.

Figure 2:
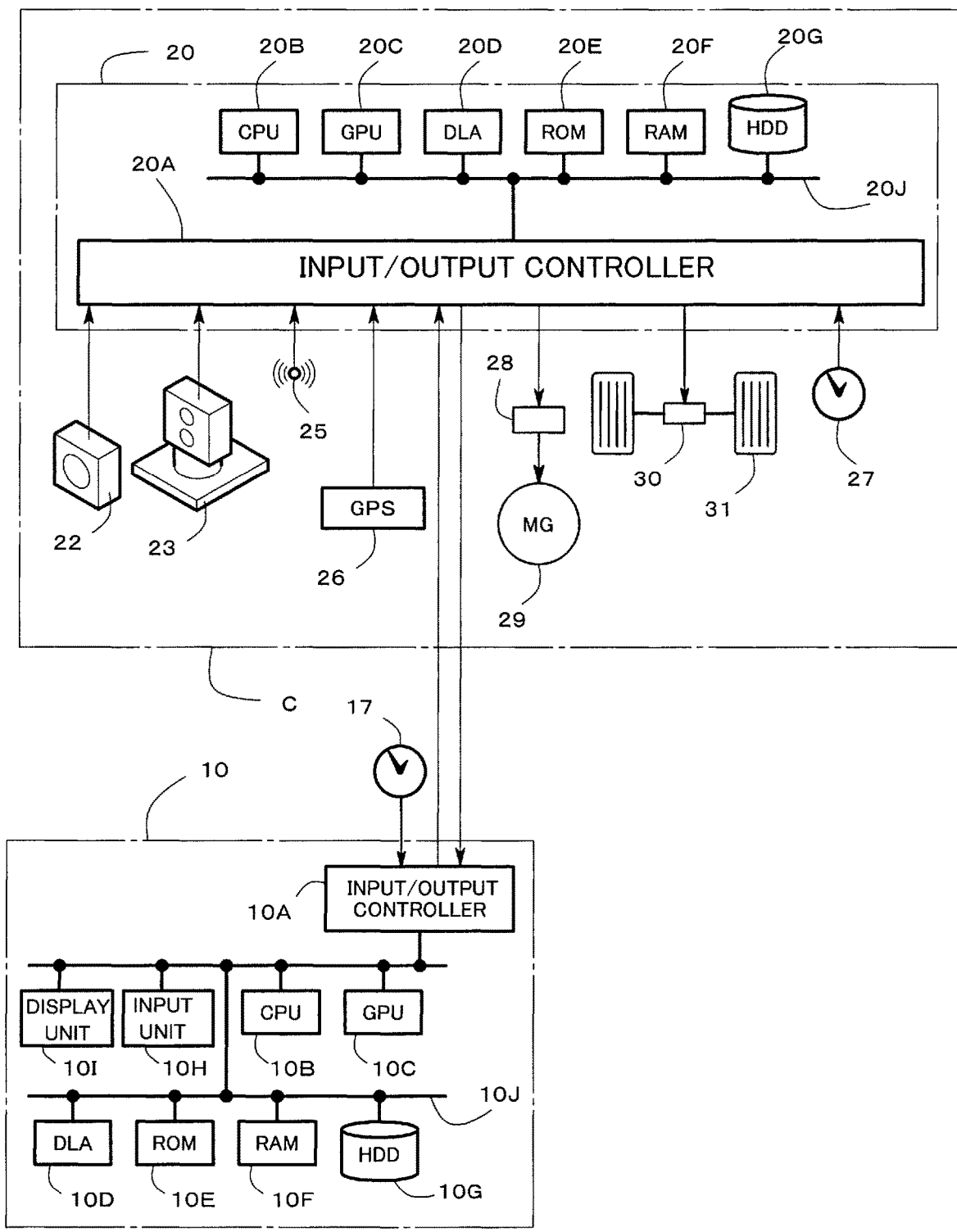
FIG. 2 is a diagram illustrating the hardware structure of the operation management device and the automatic running vehicle.
Figure 3:
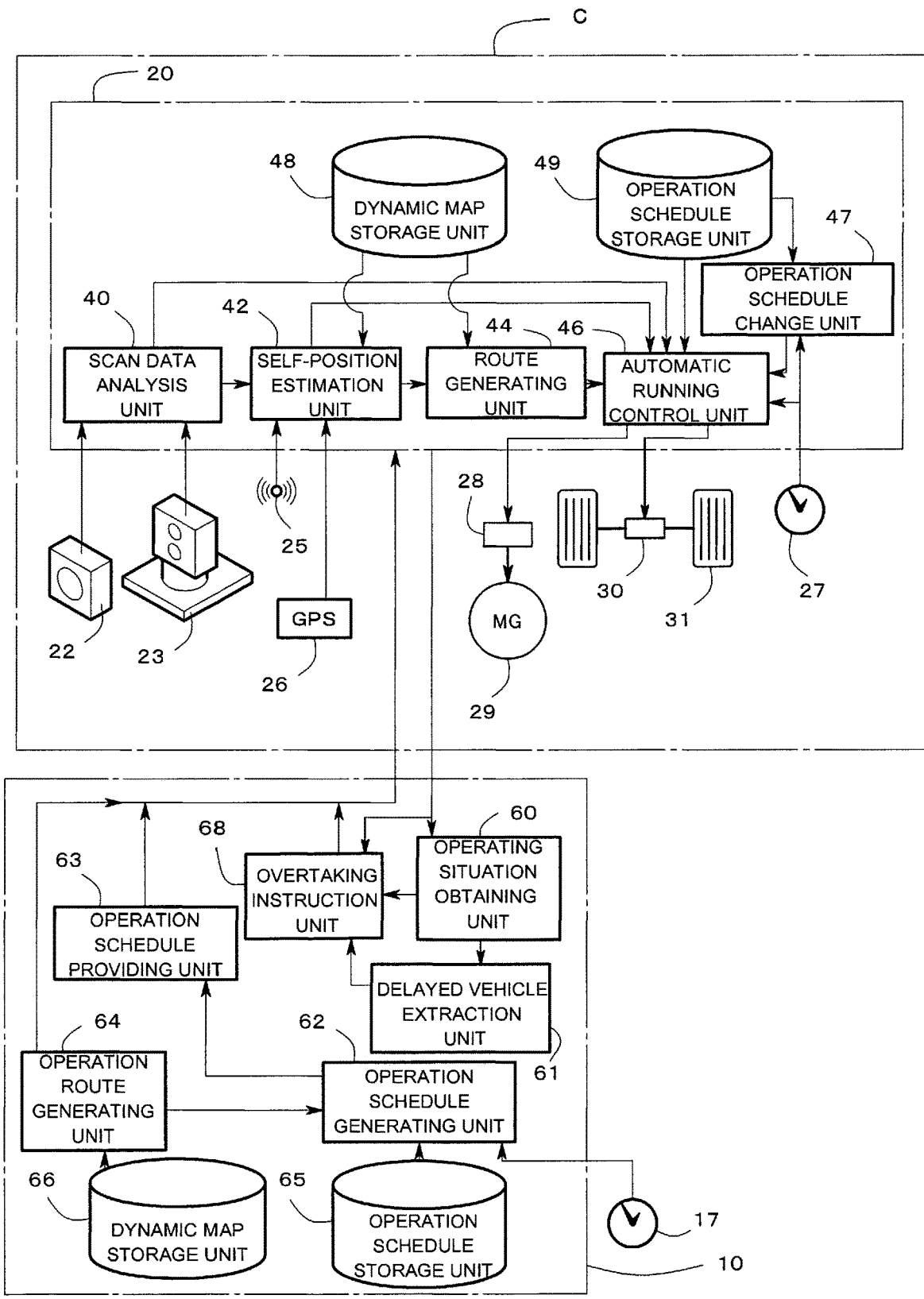
FIG. 3 is a functional block diagram of the operation management device and the automatic running vehicle.

A vehicle C is a vehicle capable of automatic running. For example, the vehicle C is a vehicle that satisfies the levels 3 to 5 defined by the Society of Automotive Engineers, Inc. (SAE) in the U.S.A. FIG. 2 illustrates an exemplary hardware structure of the vehicle C and the operation management device 10. FIG. 3 illustrates functional blocks of the vehicle C and the operation management device 10 together with the hardware.

As exemplified in FIG. 2 and FIG. 3, the vehicle C is an electrical vehicle having a rotary electric machine 29 (a motor) as a driving source and a battery, not illustrated, as a power source. The vehicle C is capable of communication with the operation management device 10; that is, exchange of data, by means of radio communication.

The vehicle C includes a mechanism for enabling automatic running Specifically, the vehicle C includes a control unit 20, a camera 22, a lidar unit 23, a proximity sensor 25, a GPS receiver 26, a clock 27, a driving mechanism 28, and a steering mechanism 30.

The camera 22 captures an image in the field of view substantially identical to that of the lidar unit 23. The camera 22 includes an image sensor, such as a CMOS sensor or a CCD sensor. An image captured by the camera 22 (a captured image) is utilized in automatic running control, as will be described later.

The lidar unit 23 (a LiDAR unit) is a sensor for automatic running, for example, a distance sensor utilizing infrared radiation. For example, the lidar unit 23 emits infrared laser beams in the horizontal direction and the vertical direction for scanning to obtain three dimensional (3D) point data; that is, three-dimensionally aligned distance data on the surrounding environment of the vehicle C. The camera 22 and the lidar unit 23 are mounted together as one sensor unit on each of the four surfaces of a vehicle C; namely, for example, the front surface, the rear surface, and the two side surfaces connecting the front surface and the rear surface.

The proximity sensor 25 is, for example, a sonar sensor, and, for example, determines the distance between the vehicle C and a curbstone, or the boundary between a driveway and a sidewalk, when the vehicle C is about to stop at a bus stop ST. This determination enables control to stop the vehicle C at a position close enough to the curbstone, or a so-called positive fitness control. The proximity sensor 25 is provided, for example, on each side surface of the vehicle C and each corner between the front surface and a side surface.

The GPS receiver 26 receives a positioning signal from a GPS satellite. For example, receiving this positioning signal enables obtaining of the current position (latitude and longitude) of the vehicle C.

The control unit 20 may be, for example, an electronic control unit (ECU) of the vehicle C, and includes a computer. The control unit 20, exemplified in FIG. 2, includes an input/output controller 20A for controlling data input/output. The control unit 20 further includes a central processing unit (CPU) 20B, a graphics processing unit (GPU) 20C, and a deep learning accelerator (DLA) 20D as calculation devices. The control unit 20 still further includes a read-only memory (ROM) 20E, a random-access memory (RAM) 20F, and a hard disk drive 20G (HDD) as storage units. These structural components are connected to an internal bus 20J.

FIG. 3 illustrates exemplary functional blocks of the control unit 20. The functional blocks include a scan data analysis unit 40, a self-position estimation unit 42, a route generating unit 44, an automatic running control unit 46, and an operation schedule change unit 47. The control unit 20 includes a dynamic map storage unit 48 and an operation schedule storage unit 49 as storage units.

The dynamic map storage unit 48 stores dynamic map data on the predetermined route 100 and areas around the predetermined route 100. A dynamic map is a 3D map, for example, including the locations and shapes (3D shapes) of roads (driveways and sidewalks). The dynamic map may further include the positions of lanes, crossings, stop lines, or the like, drawn on roads. The dynamic map still further includes the positions and shapes (3D shapes) of structures, such as buildings and signals for vehicles. The dynamic map data is provided by the operation management device 10.

The operation schedule storage unit 49 stores an operation schedule of the vehicle C carrying the storage unit. As described above, the operation schedule is updated at the operation schedule update point Pu (refer to FIG. 1) for every circulation of the predetermined route 100 by the vehicle C.

The vehicle C automatically runs according to the data on the predetermined route 100 stored in the dynamic map storage unit 48. For automatic running, 3D point data on the surrounding environment of the vehicle C are obtained by the lidar unit 23. Further, the camera 22 captures an image of the surrounding environment of the vehicle C.

An object shown in an image captured by the camera 22 is analyzed by the scan data analysis unit 40. For example, if an object is detected in a captured image by means of a known deep learning method, such as Single Shot Multibox Detector (SSD) utilizing supervised learning, or You Only Look Once (YOLO), attributes (bus stops ST, foot passengers, structures, or the like) of the detected object are recognized.

The scan data analysis unit 40 further obtains the 3D point data (lidar data) from the lidar unit 23. Superimposition of the captured image by the camera 22 and the lidar data one on the other enables knowing, for example, an object having what attribute (a bus stop ST, a foot passenger, a structure, or the like) is located how far from the vehicle equipped with the scan data analysis unit 40.

The self-position estimation unit 42 estimates the position of the vehicle carrying the self-position estimation unit 42, or a self-position, in a dynamic map, based on the self-position (latitude and longitude) received from the GPS receiver 26. The estimated self-position is used for route generation, and is also sent to the operation management device 10 together with the time information obtained from the clock 27.

The route generating unit 44 generates a route from the estimated self-position to the closest target point. For example, a route from the self-position to a bus stop ST is generated. In the case where an obstacle is detected on a route directly connecting the self-position and the bus stop ST, based on the 3D point data obtained by the lidar unit 23 and the captured image captured by the camera 22, a route that avoids the obstacle is generated.

Based on the data obtained above; namely, data obtained through superimposition of the captured image and the lidar data, the self-position, the generated route, and the operation schedule, the automatic running control unit 46 executes automatic running control for the vehicle C. For example, the running speed in running on a generated route is automatically controlled so as to be the same as a target speed V0 (to be described later) defined according to the regular operation schedule. Specifically, the automatic running control unit 46 controls the driving mechanism 28, such as an inverter, to maintain the speed of the vehicle C at the target speed V0. In addition, the automatic running control unit 46 controls the steering mechanism 30, such as an actuator, to operate the wheels 31 such that the vehicle C moves along the determined route.

At a bus stop ST, the automatic running control unit 46 stops the vehicle C, and then opens the door (not illustrated). At that time, referring to the clock 27, the automatic running unit 46 maintains the vehicle C stopped until a target departure time Td* (to be described later) defined according to the operation schedule. Upon completion of the passengers' getting off or on the vehicle C and arrival of the target departure time Td*, the automatic running control unit 46 closes the door and has the vehicle C depart.

The operation schedule change unit 47 changes the regular operation schedule stored in the operation schedule storage unit 49 when the vehicle overtakes its preceding vehicle or is overtaken by its following vehicle, as will be described later in detail.

<Structure of Operation Management Device>

The operation management device 10 manages the operation of a plurality of vehicles C that automatically run along the predetermined route 100. The operation management device 10 is installed, for example, in a management company that manages the operation of the vehicles C. The operation management device 10 includes, for example, a computer. FIG. 2 exemplifies the hardware structure of the operation management device 10.

Similar to the hardware structure of the vehicle C, the operation management device 10 includes an input/output controller 10A, a CPU 10B, a GPU 10C, a DLA 10D, a ROM 10E, a RAM 10F, and a hard disk drive 10G (HDD). These structural components are connected to an internal bus 10J.

The operation management device 10 additionally includes an input unit 10H, such as a keyboard or a mouse, for arbitrarily inputting data. Further, the operation management device 10 includes a display unit 10I, such as a display, for viewing and displaying an operation schedule or the like. The input unit 10H and the display unit 10I are connected to the internal bus 10J.

FIG. 3 illustrates exemplified functional blocks of the operation management device 10. The operation management device 10 includes an operation schedule storage unit 65 and a dynamic map storage unit 66 as storage units. The operation management device 10 additionally includes an operating situation obtaining unit 60, a delayed vehicle extraction unit 61, an operation schedule generating unit 62, an operation schedule providing unit 63, an operation route generating unit 64, and an overtaking instruction unit 68 as functional units.

The operation route generating unit 64 generates a route along which the vehicles C runs; namely, the predetermined route 100. For example, the predetermined route 100 is generated through selection of routes from among roads including branches. Dynamic map data corresponding to the generated predetermined route 100 are extracted from the dynamic map storage unit 66, and sent to the vehicles C.

The operation schedule generating unit 62 generates an operation schedule to be provided to a plurality of operating vehicles C running along the predetermined route 100. As will be described later, the operation schedule generating unit 62 can generate a regular operation schedule. Also as to be described later, the operation schedule generating unit 62 can calculate a target arrival time Ta* and a target departure time Td* at each of the bus stops ST1 to ST3, based on the generated operation schedule and the time information obtained from the clock 17. Note that the clock 17, provided outside the operation management device 10 in FIG. 2, may be provided inside the operation management device 10.

The operation schedule providing unit 63 provides the operation schedule generated by the operation schedule generating unit 62 to an operating vehicle C at the operation schedule update point Pu (the operation schedule update position). As described above, the operation schedule providing unit 63 provides an operation schedule for one round of the predetermined route 100, or a circulating route, to an operating vehicle C passing through the operation schedule update point Pu.

The operating situation obtaining unit 60 obtains vehicle information from an operating vehicle C (vehicles C1 to C4 in FIG. 1) running along the predetermined route 100. The vehicle information includes the current position, the number of passengers on board, the state of charge (SOC) of the battery, information on various devices obtained by an onboard sensor, or the like. Based on the operating situations of the respective operating vehicles C, the delayed vehicle extraction unit 61 extracts a delayed vehicle that is delayed in actual operation relative to the operation schedule from among the plurality of operating vehicles C.

When a delayed vehicle is caused, the overtaking instruction unit 68 outputs an overtaking instruction to a following vehicle that immediately follows the delayed vehicle. Further, for overtaking, the overtaking instruction unit 68 outputs a stop instruction to the delayed vehicle. The process for overtaking will be described later.

<Operation Schedule>

Figure 4:
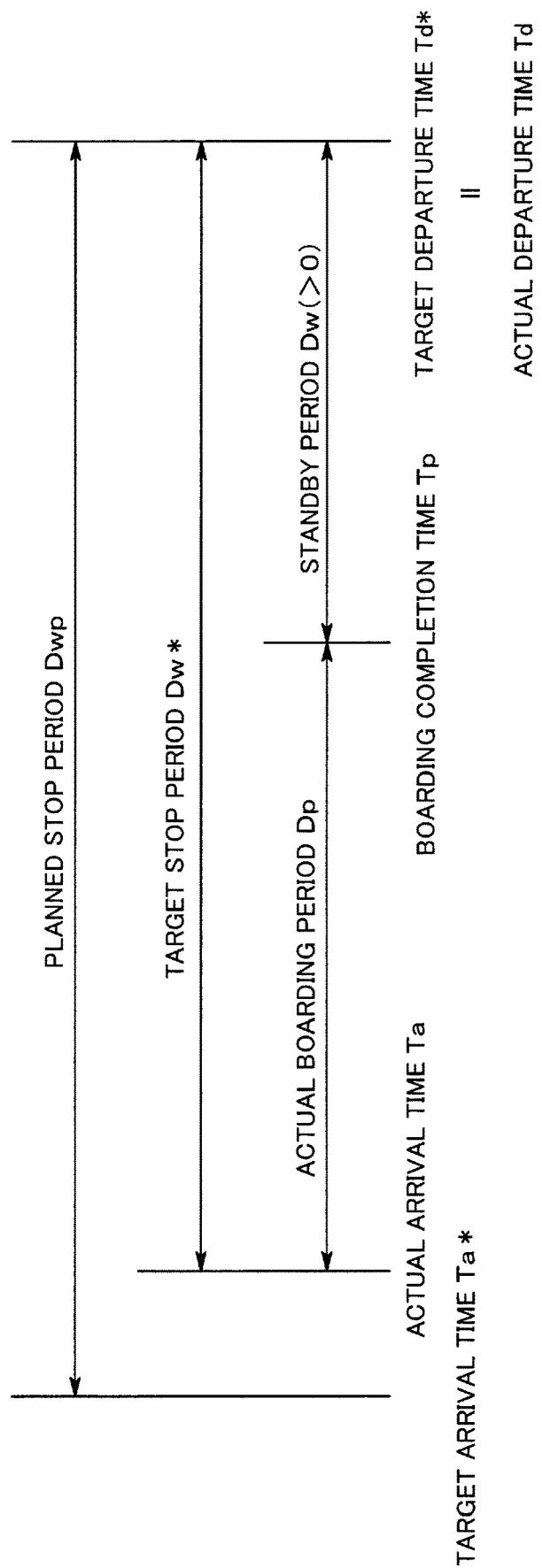
FIG. 4 is a diagram (1/2) explaining terms used in generation of an operation schedule.
Figure 5:
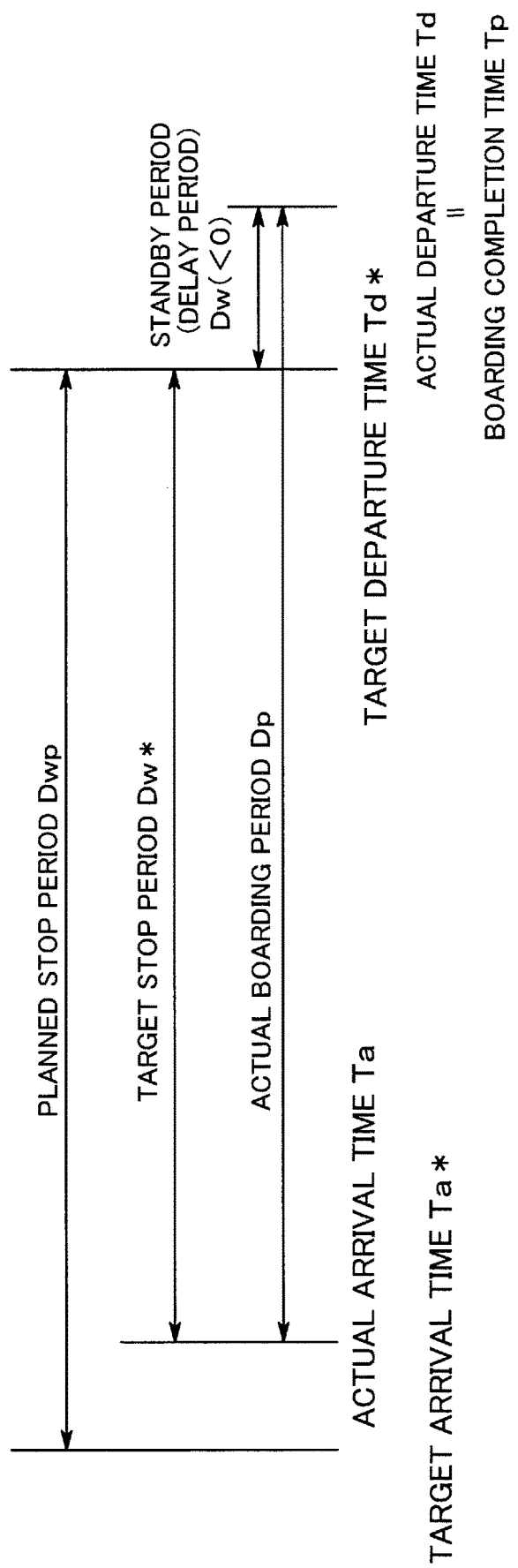
FIG. 5 is a diagram (2/2) explaining terms used in generation of an operation schedule.

Terms to be used in generating or changing operation schedule are shown as examples in FIG. 4 and FIG. 5. As exemplified in FIG. 4, for regular operation schedule, a target arrival time Ta* at which a vehicle C arrives at each bus stop ST and a target departure time Td* at which the vehicle C departs the bus stop ST are determined for every vehicle C. The period of time from the target arrival time Ta* to the target departure time Td* is a period of time during which the vehicle C remains stopped according to the schedule, and is referred to as a planned stop period Dwp.

In actual operation, a vehicle C may arrive at a bus stop ST at a time different from the target arrival time Ta* due to delay attributed to a longer period of time taken for passengers to get on or off the vehicle C at a previous bus stop or, for example, heavy traffic along the predetermined route C. This actual arrival time is referred to as an actual arrival time Ta. The period of time from the actual arrival time Ta to the target departure time Td* is a target period of time for having the vehicle C depart the bus stop ST on schedule, and referred to as a target stop period Dw*.

A period of time actually taken for passengers to get on or off a vehicle C is referred to as an actual boarding period Dp. An actual boarding period Dp is a period of time from the actual arrival time Ta to a boarding completion time Tp. A boarding completion time Tp can be estimated by analyzing by the scan data analysis unit 40 a captured image captured by the camera 22 mounted on a side surface of the vehicle C and the 3D point data provided by the lidar unit 23. For example, a later one of the time points obtained through analysis by the scan data analysis unit 40; namely, the time at which all awaiting passengers have gotten on the vehicle C through the door with none left waiting for boarding, and the time at which all passengers to get off the vehicle C have gotten off the vehicle C through the door with none left for getting off the vehicle C, is determined as the boarding completion time Tp. A period of time obtained by subtracting the actual boarding period Dp from the target stop period Dw* is referred to as a standby period Dw.

FIG. 4 illustrates an exemplary case in which the standby period Dw takes a positive value. In this case, the standby period Dw corresponds to a period of time from the boarding completion time Tp to the target departure time Td*; that is, a period of time during which the vehicle C is waiting for the departure time after completion of the passengers' getting on or off the vehicle C. After elapse of the standby period Dw and upon arrival of the target departure time Td*, the vehicle C departs the bus stop. That is, in the case where the standby period Dw takes a positive value, an actual departure time Td, or a time at which the vehicle C actually departs the bus stop ST, is basically the same as the target departure time Td*.

FIG. 5 illustrates an exemplary case in which the actual boarding period Dp exceeds the target stop period Dw* and the standby period Dw thus takes a negative value, that is, a case in which the standby period Dw is expressed in the form of a delay period Dw. In this case, as passengers keep getting on or off the vehicle C even after elapse of the target departure time Td*, and the vehicle C departs immediately after completion of the passengers' getting on or off the vehicle C, the boarding completion time Tp is basically the same as the actual departure time Td.

<Regular Operation Schedule>

Figure 6:
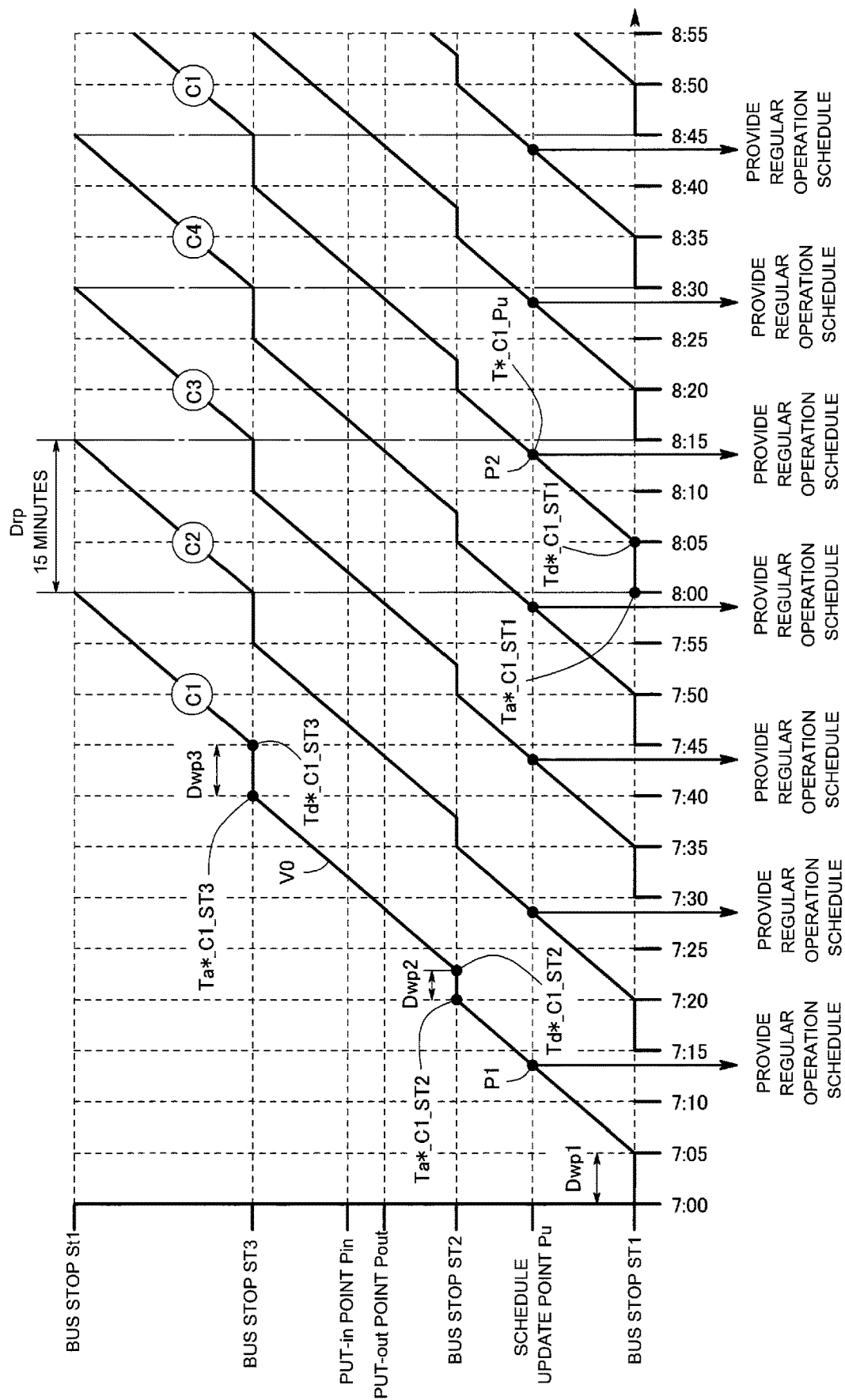
FIG. 6 is a diagram describing an exemplary regular operation schedule.

FIG. 6 illustrates an exemplary diagram based on the regular operation schedule. The horizontal axis of the diagram indicates time, and the vertical axis indicates respective points on the predetermined route 100, including the bus stops ST1 to ST3, the operation schedule update point Pu, the put-out point Pout, and the put-in point Pin. Such a regular operation schedule is generated by the operation schedule generating unit 62.

In FIG. 6, a regular operation schedule for four vehicles C1 to C4 to run at planned operation intervals Drp of 15 minutes is prepared. The regular operation schedule refers to operation schedule to be applied when vehicles are automatically running along the predetermined route 100 in circulation while the number of vehicles automatically running along the predetermined route 100 remains unchanged. In other words, the regular operation schedule is applied when vehicles C run in circulation along the predetermined route 100 with no increase or decrease in the number of vehicles C.

For example, according to the regular operation schedule, planned stop periods Dwp1, Dwp2, Dwp3 at the respective bus stops ST1 to ST3 for the respective vehicles C are set uniform so that the operation intervals between the respective operating vehicles C running along the predetermined route 100 are uniform, and the target speed V0 as well is set uniform among the respective vehicles C.

The target speeds V0 and the planned stop periods Dwp1, Dwp2, Dwp3 at the respective bus stops ST1 to ST3, which are set according to the regular operation schedule, are arbitrarily referred to as "regular values" as well. In view of the above, the regular operation schedule can be rephrased as an operation schedule prepared using regular values. The regular operation schedule is determined by the operation schedule generating unit 62 of the operation management device 10, for example, before actual operation according to the operation schedule starts.

A time at which the vehicle C passes each point along the predetermined route 100 is obtained based on the target speed V0 and the planned stop periods Dwp1, Dwp2, Dwp3. For example, a time at which the vehicle C passes through the operation schedule update point Pu is obtained from the clock 17 (refer to FIG. 2).

For example, FIG. 6 shows a passing time of the vehicle C1. A target arrival time Ta*_C1_ST2 at which the vehicle C1 arrives at the bus stop ST2 is obtained, with the above-described passing time at the operation schedule update point Pu as a start, based on the distance to the bus stop ST2 and the target speed V0. Further, a target departure time Td*_C1_ST2 is obtained, based on the planned stop period Dwp2.

Similarly, a target arrival time Ta*_C1_ST1 and a target arrival time Ta*_C1_ST3 at which the vehicle C1 arrives at the respective bus stops ST1, ST3 are obtained, based on the respective distances between the respective bus stops ST, the target speed V0, and the respective planned stop periods Dwp1, Dwp3. Further, a target departure time Td*_C1_ST1 and a target departure time Td*_C1_ST3 at which the vehicle C1 departs the respective bus stops ST1, ST3 are obtained. Still further, a target passing time T*_C1_Pu at the operation schedule update point Pu is obtained, based on the distance from the bus stop ST1 to the operation schedule update point Pu, and the target speed V0.

The operation schedule providing unit 63 (FIG. 3) provides the regular operation schedule to each of the vehicles C1 to C4 at the operation schedule update point Pu when the vehicle passes through the operation schedule update point Pu (the operation schedule update position). In the above, the operation schedule providing unit 63 provides a regular operation schedule for one circulation to an operating vehicle C1 to C4 passing through the operation schedule update point Pu.

For example, when the operating vehicle C1 passes through the schedule update point Pu, operation schedule data for a period from a time when the operating vehicle C1 passes through the operation update point Pu to a time when the operating vehicle C1 will pass through the operation schedule update point Pu next time (for example, from the point P1 to point P2 in FIG. 6) is provided to the operating vehicle C1.

In the above, the operation schedule data to be provided to each operating vehicle Ck (k=1 to 4 when four vehicles are running) include target arrival time points Ta*_Ck_ST1 to Ta*_Ck_ST3 at which the operating vehicle Ck arrives at the respective bus stops ST1 to ST3, and target departure time points Td*_Ck_ST1 to Td*_Ck_ST3 at which the operating vehicle Ck departs the respective bus stops ST1 to ST3. Further, the operation schedule data to be provided to the operating vehicle Ck also includes the planned stop periods Dwp1, Dwp2, Dwp3 at the respective bus stops ST1 to ST3 and the target speed V0. In addition, the operation schedule data to be provided to the operating vehicle Ck also include a target passing time T*_Ck_Pu at which the operating vehicle Ck will pass through the operation schedule update point Pu next time and the planned operation interval Drp between the respective operating vehicles Ck.

<Overtaking Process>

Figure 7:
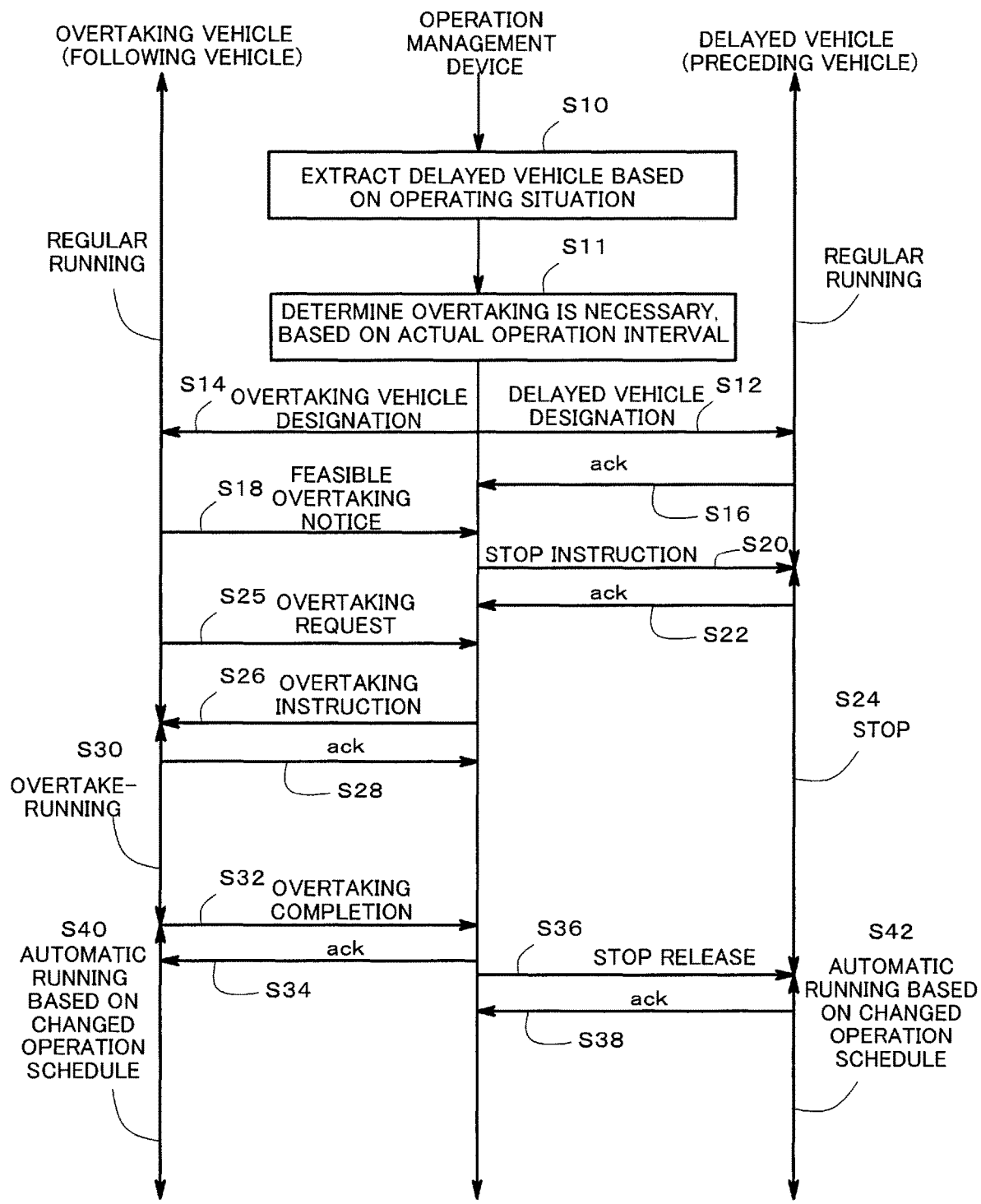
FIG. 7 is a flowchart of an exemplary overtaking process in a traffic system according to the embodiment.
Figure 8:
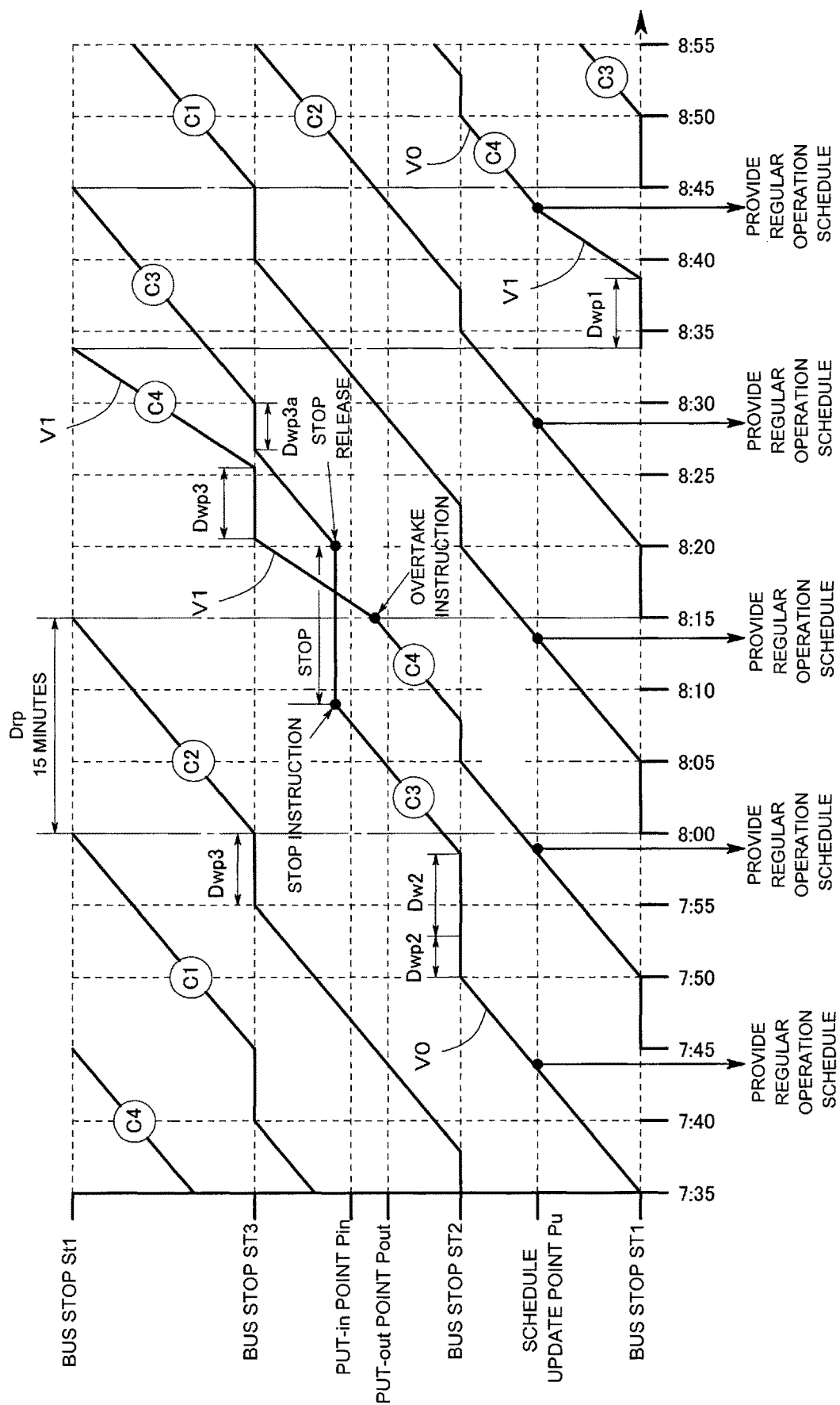
FIG. 8 is a diagram illustrating an exemplary diagram for an overtaking process.

FIG. 7 is an exemplary flowchart of the overtaking process according to this embodiment. FIG. 8 illustrates an exemplary diagram for an overtaking process.

The operating situation obtaining unit 60 of the operation management device 10 obtains an operating situation information from each of the operating vehicles C1 to C4. Specifically, the operating situation information is obtained for every predetermined interval, for example, for every 0.1 [μSec]. Further, the delayed vehicle extraction unit 61 extracts a vehicle delayed in actual operation relative to the regular operation schedule from among the operating vehicles C1 to C4, based on the operating situation information obtained by the operating situation obtaining unit 60 (S10 in FIG. 7).

Specifically, the operating situation obtaining unit 60 obtains the current position from each of the operating vehicles C1 to C4. Further, the delayed vehicle extraction unit 61 obtains a delay period Dw of each vehicle, based on the obtained current position, the time at which the current position is obtained, or an obtained time, and the position and a target time at that position based on the regular operation schedule.

For example, in FIG. 8, the boarding period exceeds the planned stop period Dwp2 while the vehicle C3 is stopped at the bus stop ST2. That is, for example, passengers' getting on or off the vehicle C3 is completed at the time after elapse of the delay period Dw2 from the planned stop period Dwp2, and the vehicle C3 then departs the bus stop ST2. In the above, the delay period of the vehicle C3 is a delay period Dw2. An overtaking process will be hereinafter described, referring to the vehicle C3 as a delayed vehicle and the vehicle C4 as a following vehicle (an overtaking vehicle).

The delayed vehicle extraction unit 61 determines whether overtaking the delayed vehicle C3 is necessary. For example, the delayed vehicle extraction unit 61 obtains an actual operation interval between the delayed vehicle C3 and its immediately following vehicle C4. When the actual operation interval becomes shorter than a predetermined threshold period, the delayed vehicle extraction unit 61 determines that overtaking the delayed vehicle C3 is necessary (S11 in FIG. 7). This determination enables overtaking in accordance with the closeness in actual operation interval. Note that a predetermined threshold period for the actual operation interval may be, for example, a value corresponding to 50% of the planned operation interval based on the regular operation schedule.

After determination that overtaking the delayed vehicle C3 is necessary, the delayed vehicle extraction unit 61 informs the overtaking instruction unit 68 of designation of the operating vehicle C3 as a delayed vehicle and the operating vehicle C4 as a following vehicle to overtake the vehicle.

Note that as a condition for determining whether overtaking is necessary, the delay period of the delayed vehicle C3 may be used instead of the actual operation interval. For example, when the delay period Dw2 of the delayed vehicle C3 exceeds a predetermined threshold period, the delayed vehicle extraction unit 61 determines that overtaking the delayed vehicle C3 is necessary. This determination enables overtaking in accordance with the extent of delay of the delayed vehicle. Note that a predetermined threshold period for the delay period Dw2 may be, for example, a value corresponding to 50% of the planned operation interval based on the regular operation schedule.

Alternatively, as a condition for determining whether overtaking is necessary, the percentage of the delay period Dw2 relative to the planned operation interval may be used. For example, when the percentage exceeds a predetermined threshold percentage, the delayed vehicle extraction unit 61 determines that overtaking the delayed vehicle C3 is necessary. Note that the predetermined threshold percentage may be, for example, 50%. According to this method for determination, the percentage (ratio) between the operation interval and the delay period is used in determination of whether overtaking is feasible. Thus, for example, even if a plurality of different operation intervals are set, whether overtaking is feasible can be determined in a uniform manner.

When it is determined with any of the above mentioned methods that overtaking the delayed vehicle C3 is necessary, the overtaking instruction unit 68 outputs a delayed vehicle designation instruction to the delayed vehicle C3 (S12 in FIG. 7). Further, the overtaking instruction unit 68 outputs an overtaking vehicle designation instruction to the following vehicle C4 (S14 in FIG. 7). Having received the instruction, the delayed vehicle C3 outputs an acknowledgment signal to the overtaking instruction unit 68 (S16 in FIG. 7). Meanwhile, the overtaking vehicle C4, having been instructed to overtake, checks its condition (for example, the SOC of the battery), and then outputs a feasible overtaking notice, or a notice that overtaking is feasible, to the overtaking instruction unit 68 (S18 in FIG. 7).

Having received the acknowledgement signal from the delayed vehicle C3 and the feasible overtaking notice from the overtaking vehicle C4, the overtaking instruction unit 68 outputs a stop instruction to the delayed vehicle C3 (S20 in FIG. 7). Having received the stop instruction, the automatic running control unit 46 of the delayed vehicle C3 outputs an acknowledgement signal to the overtaking instruction unit 68 (S22 in FIG. 7), and stops the delayed vehicle C3 on the predetermined route 100 (S24 in FIG. 7).

Meanwhile, the scan data analysis unit 40 of the overtaking vehicle C4 analyzes the surrounding environment information obtained from the camera 22 (refer to FIG. 3) and the lidar unit 23 of the vehicle C4 to recognize the presence of the delayed vehicle C3 in the forward direction on the predetermined route 100. When the recognized delayed vehicle C3 is stopped, the scan data analysis unit 40 allows the automatic running control unit 46 to output an overtaking request. Then, the automatic running control unit 46 sends an overtaking request notice to the overtaking instruction unit 68 of the operation management device 10 (S25 in FIG. 7).

Having received the overtaking request notice from the overtaking vehicle C4, the overtaking instruction unit 68 outputs to the overtaking vehicle C4 an overtaking instruction to overtake the immediately preceding delayed vehicle C3 (S26 in FIG. 7). Having received the overtaking instruction, the overtaking vehicle C4 outputs an acknowledgement signal to the overtaking instruction unit 68 (S28 in FIG. 7). The automatic running control unit 46 of the overtaking vehicle C4 then executes overtake-running control to overtake the delayed vehicle C3 (S30 in FIG. 7). As described in the diagram in FIG. 8, the target speed V1 of the overtake-running may be a speed faster than the target speed V0 determined according to the regular operation schedule.

Overtaking the delayed vehicle C3 by the overtaking vehicle C4 while the delayed vehicle C3 remains stopped enables highly safe overtaking; for example, overtaking with low possibility of intersection between these vehicles.

In overtake-running, the scan data analysis unit 40 of the overtaking vehicle C4 analyzes the surrounding environment information obtained from the camera 22 (refer to FIG. 3) and the lidar unit 23 of the overtaking vehicle C4 to recognize the delayed vehicle C3 on the predetermined route 100. Then, the automatic running control unit 46 generates a route that avoids the delayed vehicle C3 stopped, and executes overtake-running control to overtake the delayed vehicle C3 along the route. As described above, recognizing the surrounding situation with a function that is used in automatic running control enables highly safe overtaking.

After the overtaking vehicle C4 overtakes the delayed vehicle C3, for example, the automatic running control unit 46 controls the overtaking vehicle C4 such that the overtaking vehicle C4 continues running at the current overtaking speed V1 to the next bus stop ST3. Thereafter, the control unit 20 of the overtaking vehicle C4 outputs an overtaking completion signal to the overtaking instruction unit 68 (S32 in FIG. 7). Having received the overtaking completion signal, the overtaking instruction unit 68 outputs an acknowledgement signal to the control unit 20 of the overtaking vehicle C4 (S34 in FIG. 7). Thereafter, the automatic running control unit 46 of the overtaking vehicle C4 executes automatic running control, based on the operation schedule having been changed owing to the overtaking (S40). Change in operation schedule will be described later.

Having received the overtaking completion instruction, the overtaking instruction unit 68 outputs a stop release instruction to the delayed vehicle C3 (S36 in FIG. 7). Having received the stop release instruction, the control unit 20 of the delayed vehicle C3 outputs an acknowledgement signal to the overtaking instruction unit 68 (S38 in FIG. 7). Thereafter, the automatic running control unit 46 of the delayed vehicle C3 executes automatic running control, based on the operation schedule having been changed owing to the overtaking (S42). Change in operation schedule will be described later.

<Operation Schedule after Overtaking>

After overtaking, the overtaking vehicle C4 and the delayed vehicle C3 change the regular operation schedule and run to the schedule update point Pu. Conceptually, the overtaking vehicle C4 changes the operation schedule such that the changed operation schedule follows the regular operation schedule of the delayed vehicle C3 so far.

Figure 9:
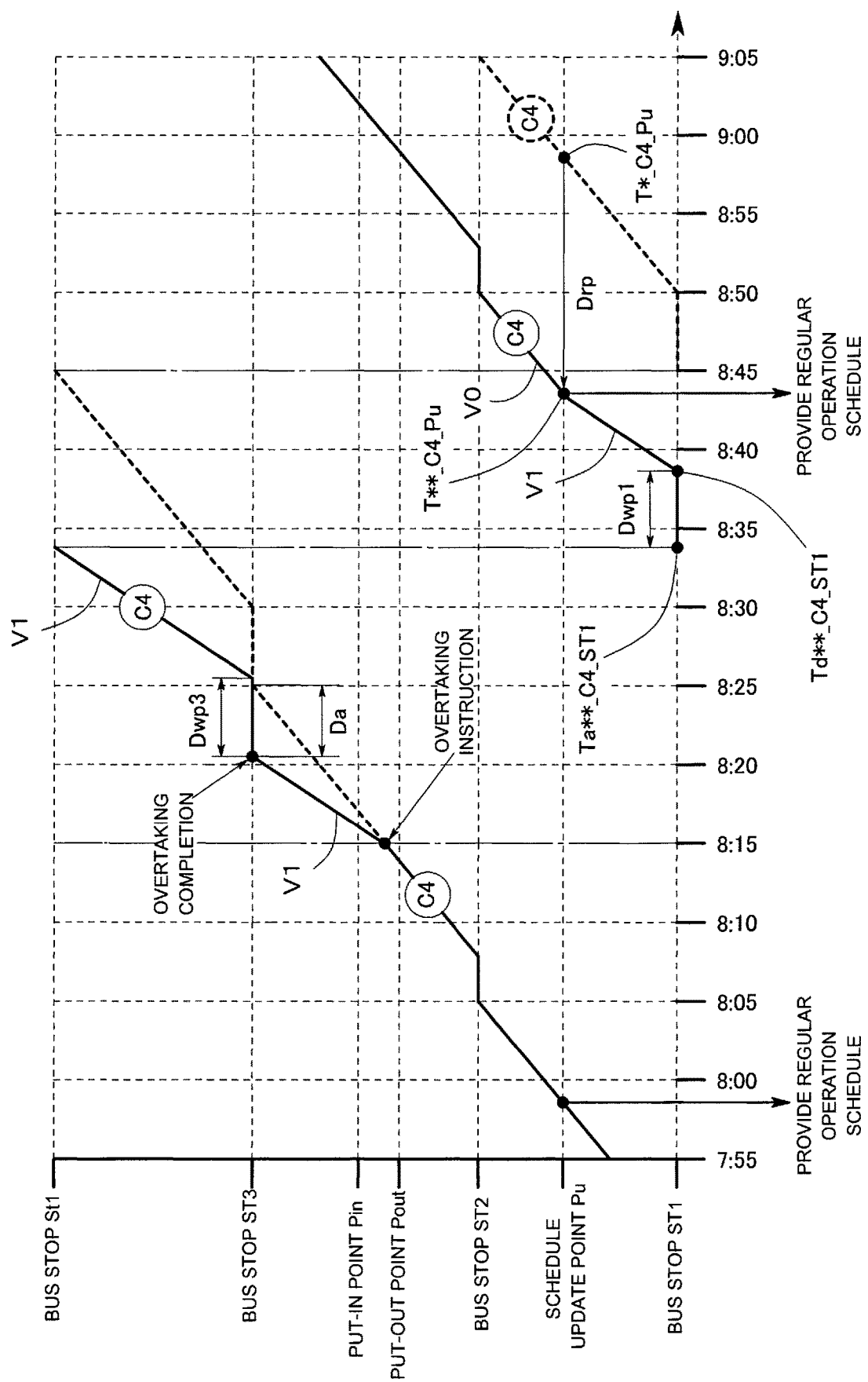
FIG. 9 is a diagram illustrating a diagram for a vehicle C4 extracted from FIG. 8.
Figure 10:
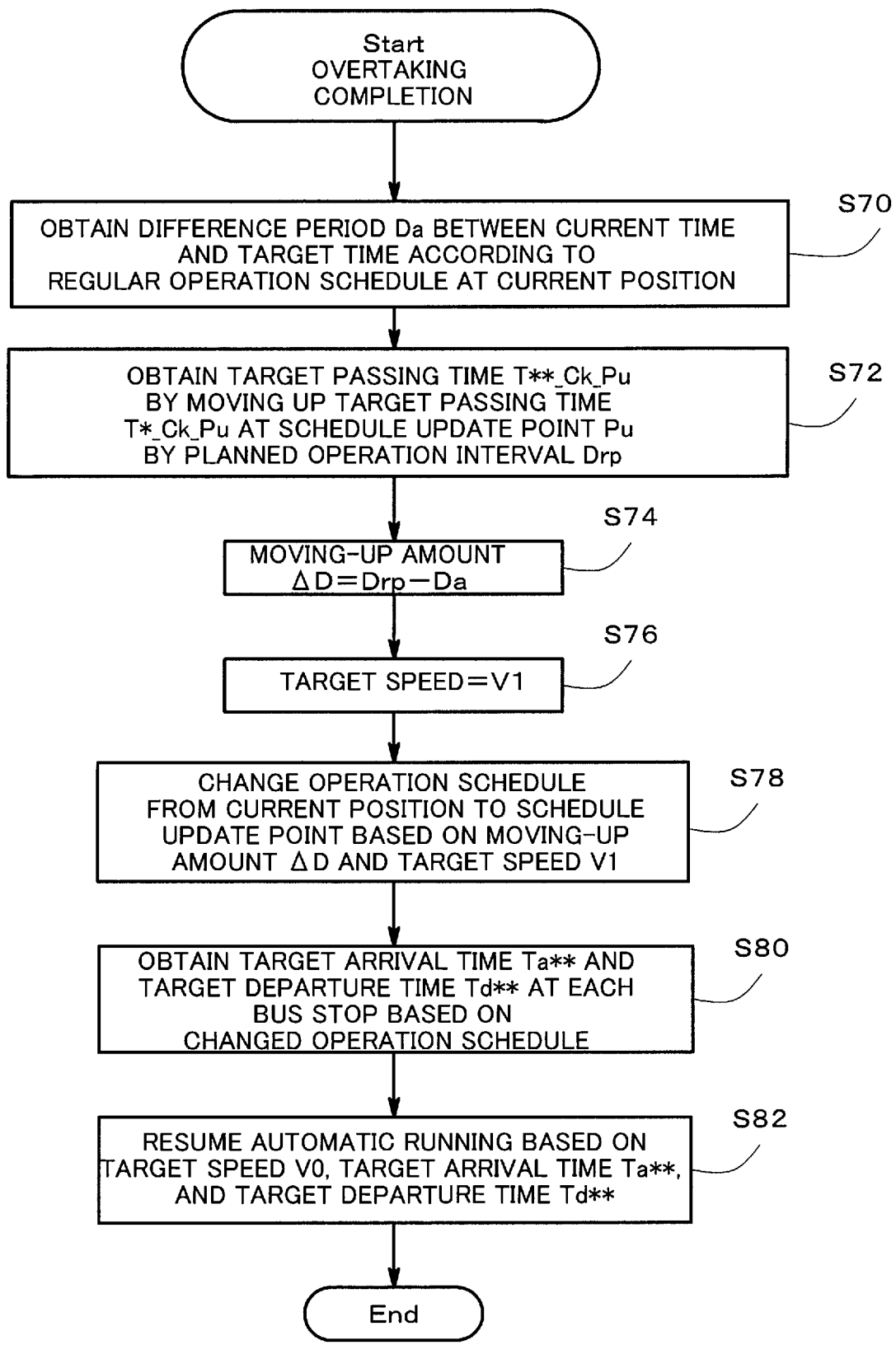
FIG. 10 is a flowchart of exemplary processing for changing the operation schedule of an overtaking vehicle.

FIG. 9 illustrates an exemplary diagram for the overtaking vehicle C4. FIG. 10 is an exemplary flowchart of changing the operation schedule. Note that the sign Ck in FIG. 10 represents a vehicle C and its ID number k (k=1 to 4 in the example in FIG. 8). The overtaking vehicle C4 having overtaken the delayed vehicle C3 and arrived at the bus stop ST3; that is, having completed overtaking, opens the door, not illustrated. Further, during this period, the operation schedule change unit 47 changes the regular operation schedule stored in the operation schedule storage unit 49 by moving up the regular operation schedule, owing to the overtaking of its preceding delayed vehicle C3.

The operation schedule change unit 47 of the overtaking vehicle C4 obtains a difference period Da (refer to FIG. 9) between the current time and the target time according to the regular operation schedule at the current time (S70 in FIG. 10). That is, the difference between the overtaking completion time and the target arrival time at the bus stop ST3 makes the difference period Da.

Thereafter, the operation schedule change unit 47 sets a new target passing time T_C4_Pu at the schedule update point Pu (S72 in FIG. 10). The target passing time T_C4_Pu is a time obtained by moving up a target passing time T*_C4_Pu at the schedule update point Pu defined according to the regular operation schedule by an amount corresponding to the planned operation interval Drp (fifteen minutes).

Further, the operation schedule change unit 47 obtains a moving-up amount ΔD for the operation schedule (S74 in FIG. 10). The moving-up amount ΔD is for subtraction of the moved-up amount caused in overtaking by running at the target speed V1 in overtaking, that is, "the planned operation interval Drp−difference period Da=moving-up amount ΔD".

Further, the operation schedule change unit 47 sets the target speed to a speed V1 (>V0) (S76 in FIG. 10). Then, the operation schedule change unit 47 changes a part of the regular operation schedule from the current position to the schedule update point Pu, based on the moving-up amount ΔD and the target speed V1 (S78 in FIG. 10).

For example, when a vehicle runs from the current position to the schedule update point Pu at the target speed V1, a moved-up amount relative to the case where the vehicle runs in that section at the target speed V0 is obtained. If the moved-up amount is less than the moving-up amount ΔD, the planned standby period at a bus stop ST1 located on the route from the current position to the schedule update point Pu is shortened from the period determined according to the regular operation schedule.

Based on the operation schedule changed as described above, the operation schedule change unit 47 obtains a target arrival time Ta_C4_ST1 and a target departure time Td_C4_ST1 at the bus stop ST1 on the route from the current position to the schedule update point Pu (S80 in FIG. 10). Further, the automatic running control unit 46 resumes automatic running, based on the target speed V0, the target arrival time Ta_C4_ST1, and the target departure time Td_C4_ST1 (S82 in FIG. 10).

As described above, running control by the automatic running control unit 46 of the overtaking vehicle C4 is executed based on the operation schedule obtained by shortening and changing the regular operation schedule. As such running control enables eliminating a delay of the overtaking vehicle C4 relative to the planned operation interval at the schedule update point Pu, a regular operation schedule is provided from the operation schedule providing unit 63 (refer to FIG. 3).

Meanwhile, the operation schedule change unit 47 of the delayed vehicle C3 as well, having been overtaken by the overtaking vehicle C4, changes the regular operation schedule for the delayed vehicle C3. Conceptually, the operation schedule for the delayed vehicle C3 is changed such that the changed schedule is similar to the regular operation schedule for the vehicle C4, which has followed the delayed vehicle C3 until the overtaking. For example, when the control unit 20 receives a stop release instruction from the overtaking instruction unit 68, the operation schedule change unit 47 changes the operation schedule.

Figure 11:
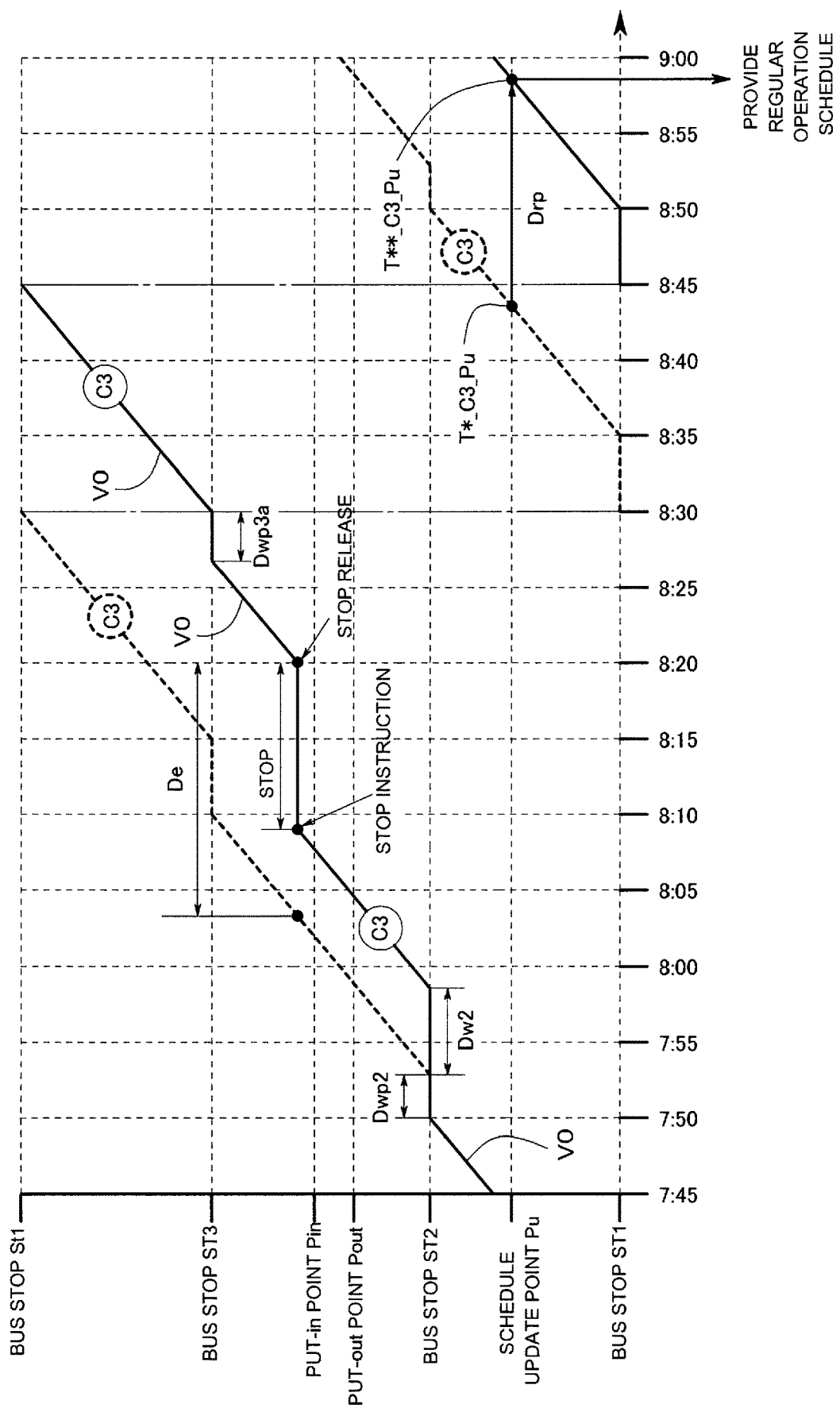
FIG. 11 is a diagram illustrating a diagram for a vehicle C3 extracted from FIG. 8.
Figure 12:
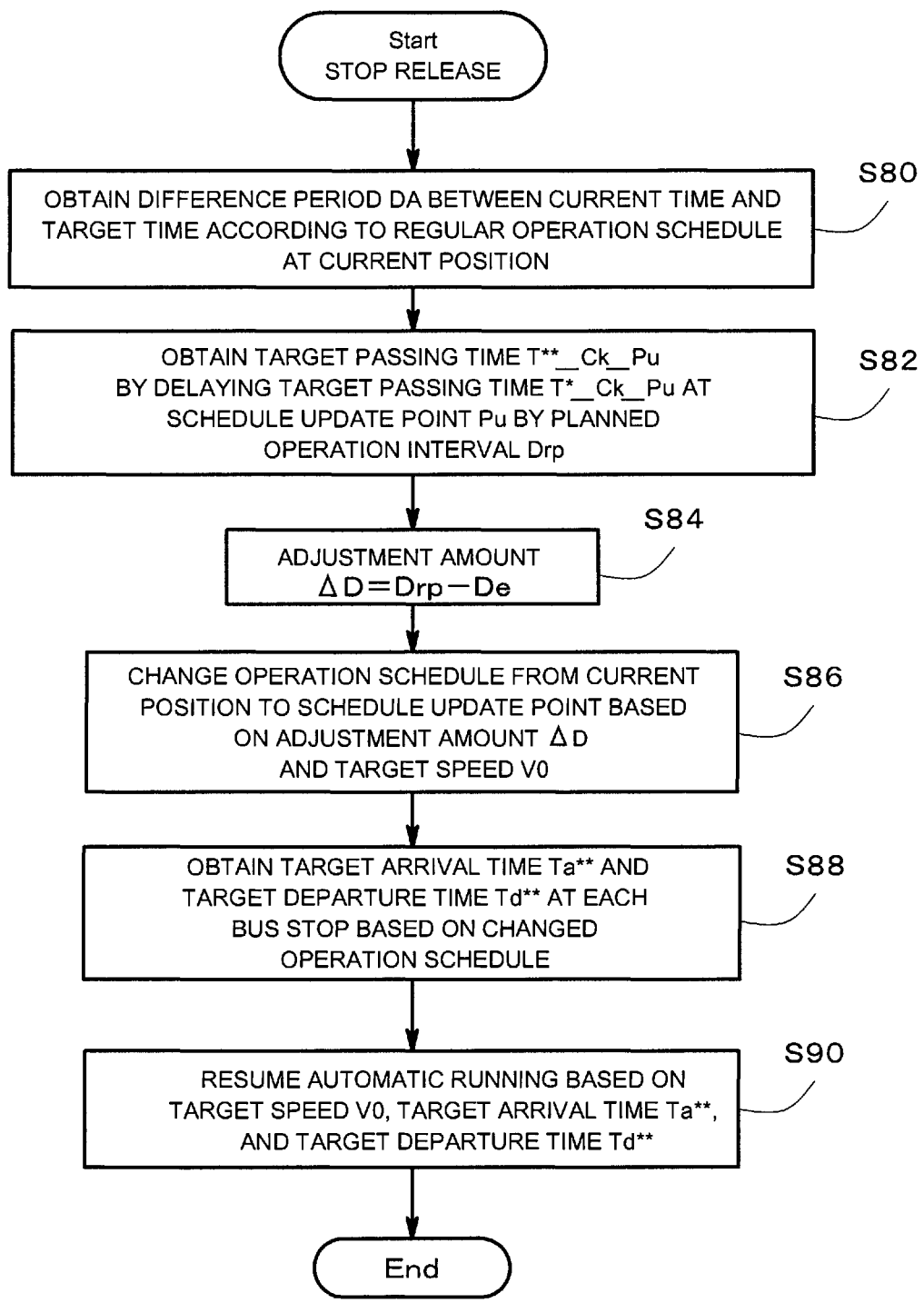
FIG. 12 is a flowchart of exemplary processing for changing the operation schedule of a delayed vehicle.

FIG. 11 illustrates an exemplary diagram for the delayed vehicle C3. FIG. 12 is an exemplary flowchart of changing the operation schedule. Note that the sign Ck in FIG. 12 represents a vehicle C and its ID number k (k=1 to 4 in the example in FIG. 8). Having received the stop release notice from the operation management device 10, the operation schedule change unit 47 of the delayed vehicle C3 changes the regular operation schedule stored in the operation schedule storage unit 49 by delaying the schedule.

The operation schedule change unit 47 of the delayed vehicle C3 obtains a difference period De (refer to FIG. 11)

between the current time and the target time according to the regular operation schedule at the current position (S80 in FIG. 12).

Then, the operation schedule change unit 47 sets a new target passing time T_C3_Pu at the schedule update point Pu (S82 in FIG. 12). The target passing time T_C3_Pu is a time obtained by delaying a target passing time T*_C3_Pu at the schedule update point Pu defined according to the regular operation schedule by an amount corresponding to the planned operation interval Drp (fifteen minutes).

Further, the operation schedule change unit 47 obtains an adjustment amount ΔD for the operation schedule (S84 in FIG. 12). The adjustment amount ΔD is for subtraction of the delay period Dw2 caused in actual operation and a delay period caused due to stoppage of the vehicle when being overtaken, from the planned operation interval Drp, that is, "the planned operation interval Drp−the difference period De=adjustment amount ΔD".

Further, the operation schedule change unit 47 sets the target speed to V0, and changes a part of the regular operation schedule from the current position to the schedule update point Pu, based on the adjustment amount ΔD (S86 in FIG. 12).

For example, as the target speed V0 is kept at a value defined according to the regular operation schedule, the planned standby period at the bus stop ST1 located on the route from the current position to the schedule update point Pu is to be adjusted.

For example, in the case where the adjustment amount ΔD takes a positive value, the planned standby period at the bus stop ST1 is extended. Meanwhile, in the case where the adjustment amount ΔD takes a negative value, which means that the delay caused during the period from actual operation to completion of overtaking is longer than the planned operation interval Drp, the planned standby period at the bus stop ST1 is shortened.

Based on the operation schedule changed as described above, the operation schedule change unit 47 obtains the target arrival time Ta_C3_ST1 and the target departure time Td_C3_ST1 at the bus stop ST1 located on the route from the current position to the schedule update point Pu (S88 in FIG. 12). Further, the automatic running control unit 46 resumes automatic running, based on the target speed V0, the target arrival time Ta_C3_ST1, and the target departure time Td_C3_ST1 (S90 in FIG. 12).

As described above, running control by the automatic running control unit 46 of the delayed vehicle C3 is executed, based on the operation schedule obtained by changing the regular operation schedule. As such running control enables elimination of a discrepancy of the delayed vehicle C3 relative to the planned operation interval at the schedule update point Pu, a regular operation schedule is provided from the operation schedule providing unit 63 (refer to FIG. 3).

<Another Example of Overtaking Process>

Figure 13:
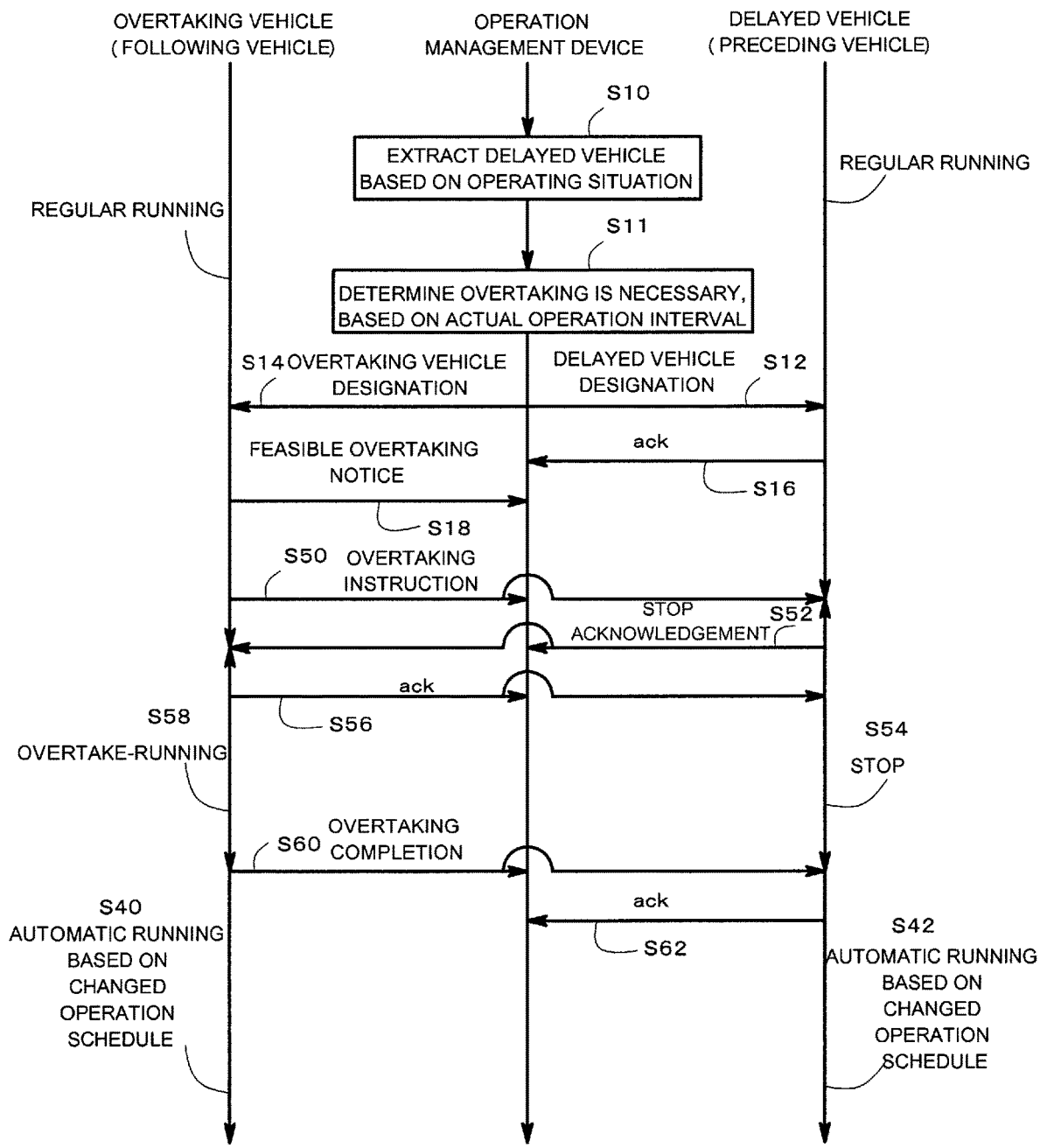
FIG. 13 is a diagram illustrating an exemplary diagram for executing an overtaking process according to another embodiment.

FIG. 13 is another exemplary flowchart of the overtaking process according to this embodiment. In the overtaking process exemplified in FIG. 7, the operation management device 10 takes the initiative in managing overtaking. In contrast, in the overtaking process exemplified in FIG. 13, the delayed vehicle C3 and the overtaking vehicle C4 communicate with each other after receipt of an overtaking vehicle designation and a delayed vehicle instruction, to cooperatively execute overtaking.

As the process exemplified in FIG. 13 from the start to step S18, where the overtaking vehicle C4 outputs a feasible overtaking notice to the operation management device 10, is the same as that included in the flowchart in FIG. 7, these steps will not be described again.

The overtaking vehicle C4 outputs an overtaking request instruction to the delayed vehicle C3 (S50 in FIG. 13). In addition, the same instruction is outputted to the operation management device 10, or an administrator. The control unit 20 of the delayed vehicle C3 receives the overtaking request instruction, and then outputs a signal for acknowledgement and for informing that the delayed vehicle C3 has stopped, to the overtaking vehicle C4 and the operation management device 10 (S52 in FIG. 13). Further, the automatic running control unit 46 of the delayed vehicle C3 stops the delayed vehicle C3 (S54 in FIG. 13).

Meanwhile, having received the acknowledgement and stop signal, the overtaking vehicle C4 outputs an acknowledgement signal to the delayed vehicle C3 and the operation management device 10 (S56 in FIG. 13). Thereafter, the automatic running control unit 46 of the overtaking vehicle C4 executes overtake-running to overtake the delayed vehicle C3 (S58 in FIG. 13).

As described in the diagram in FIG. 8, the target speed V1 for overtake-running may be a faster speed than the target speed V0 defined according to the regular operation schedule. In overtake-running, while the delayed vehicle C3, recognized from the surrounding environment information obtained from the camera 22 (refer to FIG. 3) and the lidar unit 23 of the overtaking vehicle C4, is stopped, the automatic running control unit 46 of the overtaking vehicle C4 executes overtaking control.

After the overtaking vehicle C4 overtakes the delayed vehicle C3, the control unit 20 of the overtaking vehicle C4 outputs an overtaking completion notice to the delayed vehicle C3 and the operation management device 10 (S60 in FIG. 13). After completion of overtaking, schedule change described in FIG. 10 is applied to the overtaking vehicle C4, and the automatic running control unit 46 of the overtaking vehicle C4 executes automatic running control, based on the changed operation schedule (S40).

The delayed vehicle C3, having received the overtaking completion notice in step S60, outputs an acknowledgement signal to the operation management device 10 (S62 in FIG. 13). After completion of overtaking, schedule change described in FIG. 12 is applied to the delayed vehicle C3, and the automatic running control unit 46 of the delayed vehicle C3 executes automatic running control based on the changed operation schedule (S42).

When a closely located delayed vehicle and overtaking vehicle take the initiative in executing an overtaking process without intervention of the operation management device 10, as described above, for example, delay in communication with the operation management device 10 located far from these vehicles is prevented, which enables prompt overtaking.

The present disclosure is not limited to the present embodiments described above, and includes all changes and modifications without departing from the technical scope or the essence of the present disclosure defined by the claims.

The invention claimed is:

1. An operation management device for an automatic running vehicle, for managing operation of a plurality of vehicles for automatic running along a predetermined route, comprising:
   an operation schedule providing unit for providing an operation schedule to each of the plurality of operating vehicles that are automatically running along the predetermined route;

an operating situation obtaining unit for obtaining an operating situation information of the plurality of operating vehicles on the predetermined route;

a delayed vehicle extraction unit for extracting from among the plurality of operating vehicles a delayed vehicle that is delayed in actual operation relative to the operation schedule, based on the operating situation information of each of the operating vehicles; and an overtaking instruction unit for outputting an overtaking instruction to overtake the delayed vehicle to a following vehicle that immediately follows the delayed vehicle.

2. The operation management device for an automatic running vehicle according to claim 1, wherein the overtaking instruction unit outputs a stop instruction to the delayed vehicle before outputting the overtaking instruction.

3. The operation management device for an automatic running vehicle according to claim 2, wherein when an actual operation interval between the delayed vehicle and the following vehicle becomes shorter than a predetermined threshold period, the overtaking instruction unit outputs the stop instruction to the delayed vehicle.

4. The operation management device for an automatic running vehicle according to claim 2, wherein when a delay period in actual operation of the delayed vehicle relative to the operation schedule exceeds a predetermined threshold period, the overtaking instruction unit outputs the stop instruction to the delayed vehicle.

5. The operation management device for an automatic running vehicle according to claim 2, wherein when a percentage of a delay period in actual operation of the delayed vehicle relative to the operation schedule, with respect to an operation interval between the delayed vehicle and the following vehicle, based on the operation schedule exceeds a predetermined threshold percentage, the overtaking instruction unit outputs the stop instruction to the delayed vehicle.

6. The operation management device for an automatic running vehicle according to claim 1, wherein the overtaking instruction unit outputs the overtaking instruction after having received a feasible overtaking notice from the following vehicle.

7. An automatic running vehicle for automatic running along a predetermined route, comprising:
an operation schedule storage unit for storing an operation schedule of the automatic running vehicle, provided from an operation management device; and
an automatic running control unit for executing automatic running control based on the operation schedule, and for executing overtake-running control to overtake a preceding vehicle that is an immediately preceding automatic running vehicle when having received an overtaking instruction from the operation management device.

8. The automatic running vehicle according to claim 7, comprising a sensor for obtaining surrounding environment information in a forward direction, wherein
the automatic running control unit sends an overtaking request to the operation management device while the preceding vehicle, recognized based on the surrounding environment information obtained from the sensor, remains stopped.

9. The automatic running vehicle according to claim 7, further comprising a schedule change unit for changing the operation schedule stored in the operation schedule storage unit by moving up the operation schedule, owing to overtaking of the preceding vehicle.

10. The automatic running vehicle according to claim 9, wherein
the predetermined route is a circulating route,
the operation schedule for one round of the predetermined route is provided at an operation schedule update point defined on the predetermined route, and stored in the operation schedule storage unit,
the operation schedule includes a target update point passing time at which the automatic running vehicle passes through the operation schedule update point next time, and an operation interval between automatic vehicles running along the predetermined route, and
the schedule change unit changes the target update point passing time defined in the operation schedule by moving up the target update point passing time by an amount corresponding to the operation interval, owing to overtaking of the preceding vehicle.

* * * * *